United States Patent
Haldeman et al.

(10) Patent No.: US 10,146,044 B2
(45) Date of Patent: Dec. 4, 2018

(54) COMPACT SPHERICAL DIFFRACTION LIMITED TELESCOPE SYSTEM FOR REMOTE SENSING IN A SATELLITE SYSTEM

(71) Applicant: Planet Labs Inc., San Francisco, CA (US)

(72) Inventors: Benjamin Haldeman, San Francisco, CA (US); Joseph Warga, San Francisco, CA (US)

(73) Assignee: Planet Labs Inc., San Francisco, CA (US)

( * ) Notice: Subject to any disclaimer, the term of this patent is extended or adjusted under 35 U.S.C. 154(b) by 143 days.

(21) Appl. No.: 15/048,714

(22) Filed: Feb. 19, 2016

(65) Prior Publication Data
US 2017/0242236 A1    Aug. 24, 2017

(51) Int. Cl.
*G02B 17/08* (2006.01)
*G02B 23/06* (2006.01)
*B64G 1/10* (2006.01)

(52) U.S. Cl.
CPC ........... *G02B 23/06* (2013.01); *B64G 1/1021* (2013.01); *G02B 17/08* (2013.01); *G02B 17/0808* (2013.01); *G02B 17/0856* (2013.01)

(58) Field of Classification Search
None
See application file for complete search history.

(56) References Cited

U.S. PATENT DOCUMENTS

| | | | | |
|---|---|---|---|---|
| 3,490,831 A | | 1/1970 | Takahashi | |
| 3,547,525 A | * | 12/1970 | Rayces | G02B 17/0808 359/729 |
| 3,926,505 A | * | 12/1975 | Rayces | G02B 17/0808 359/731 |
| 4,165,151 A | | 8/1979 | Momiyama | |
| 4,235,508 A | * | 11/1980 | Kaprelian | G02B 17/0808 359/366 |
| 4,264,136 A | | 4/1981 | Ogino | |

(Continued)

OTHER PUBLICATIONS

Yudin et al.: "Fast Catadioptric Telescopes for CCD Observation of Transient Events and Space Surveillance"; Optical Complex Systems: OCS11; Proc. of SPIE vol. 8172 817218; 2011 SPIE; Sep. 22, 2011; 0 pages.

(Continued)

*Primary Examiner* — Derek S Chapel
(74) *Attorney, Agent, or Firm* — Fountainhead Law Group P.C.

(57) ABSTRACT

In one embodiment, an optical system includes: a first lens configured to receive incoming light from an object; a first mirror comprising a central aperture, the first mirror configured to refract the light from the first lens, reflect the light, and refract the light reflected from the first mirror; a second mirror configured to receive the light from the first mirror, wherein the light is refracted towards a first surface of the second mirror where the light is reflected back and refracted upon exiting the second mirror; a negative corrector lens configured to refract the light from the second mirror through the central aperture of the first mirror; and a positive corrector lens configured to receive the light through the central aperture of the first mirror and refract the light to an imaging surface.

25 Claims, 4 Drawing Sheets

(56) References Cited

U.S. PATENT DOCUMENTS

| | | | | |
|---|---|---|---|---|
| 4,666,259 | A | 5/1987 | Iizuka | |
| 5,089,910 | A * | 2/1992 | Sigler | G02B 13/14 |
| | | | | 359/357 |
| 6,158,694 | A * | 12/2000 | Gowrinathan | B64G 1/361 |
| | | | | 244/171 |
| 2004/0119020 | A1 * | 6/2004 | Bodkin | G01J 3/02 |
| | | | | 250/353 |
| 2008/0019022 | A1 | 1/2008 | Mitchell | |
| 2011/0240801 | A1 * | 10/2011 | Manzoni | B64G 1/1021 |
| | | | | 244/171.1 |
| 2017/0299855 | A1 * | 10/2017 | Squires | G02B 23/02 |
| 2017/0329126 | A1 * | 11/2017 | Squires | G02B 26/0816 |
| 2017/0352139 | A1 * | 12/2017 | Mrdjen | G06T 5/50 |

OTHER PUBLICATIONS

International Search Report & Written Opinion for PCT Application PCT/US2017/018448 dated May 8, 2017, 17 pages.

* cited by examiner

COMPACT SPHERICAL DIFFRACTION LIMITED TELESCOPE SYSTEM FOR REMOTE SENSING IN A SATELLITE SYSTEM

BACKGROUND

Remote sensing of the Earth is promoted by the proliferation of constellations of small satellites in the nanosatellite category. Nanosatellites are composed of 10 cm cubic base units. One 10 cm cubic unit is denoted as 1U, and multiple units can be combined to form larger spacecraft. For example, a spacecraft including three base units will be 10×10×30 cm and is described as being 3U. Remote sensing nanosatellites operate ideally in low Earth orbit, typically in the altitude range of 400 to 700 km. Given their relatively small size, these nanosatellites require compact optical systems to preserve internal volume for the remainder of the support systems necessary to operate a satellite. Typically, when including a compact optical system, optical performance is sacrificed. However, the chief value of the remote sensing satellite is the imagery of the Earth that it produces, and the lower optical performance may not be acceptable.

SUMMARY

In one embodiment, an optical system includes: a first lens configured to receive incoming light from an object; a first mirror comprising a central aperture, the first mirror configured to refract the light from the first lens through a first surface of the first mirror, reflect the light at a second surface of the first mirror, and refract the light reflected from the second surface of the first mirror that is exiting the first mirror at the first surface of the first mirror; a second mirror configured to receive the light from the first mirror, wherein the light is refracted through a second surface of the second mirror towards a first surface of the second mirror where the light is reflected back towards the second surface of the second mirror and refracted by the second surface upon exiting the second mirror; a negative corrector lens configured to refract the light from the second mirror through the central aperture of the first mirror; and a positive corrector lens configured to receive the light through the central aperture of the first mirror and refract the light to an imaging surface, wherein: the first lens, the first mirror, the second mirror, the first negative corrector lens, and the second positive corrector lens are positioned along an axis in a satellite, a first distance between the first lens and the first mirror is less than one third a length of the satellite, and a back focal length of the optical system has a diameter that is no more than half of a largest diameter from the first lens and the first mirror.

In one embodiment, a satellite includes: a satellite housing comprising: satellite operational components configured to operate the satellite and downlink images captured by the optical system; and an optical system comprising: a forward portion comprising: a first lens configured to receive incoming light from an object; a first mirror comprising a central aperture, the first mirror configured to refract the light from the first lens through a first surface of the first mirror, reflect the light at a second surface of the first mirror, and refract the light reflected from the second surface of the first mirror that is exiting the first mirror at the first surface of the first mirror; a second mirror configured to receive the light from the first mirror, wherein the light is refracted through a second surface of the second mirror towards a first surface of the second mirror where the light is reflected back towards the second surface of the second mirror and refracted by the second surface upon exiting the second mirror; a negative corrector lens configured to refract the light from the second mirror through the central aperture of the first mirror; and a back portion comprising: a positive corrector lens configured to receive the light through the central aperture of the first mirror and refract the light to an imaging surface to capture images, wherein the optical system is within a length of the satellite housing and the satellite components are located around the back portion.

In one embodiment, a method includes: receiving, at a first lens, incoming light from an object; refracting, at a first mirror comprising a central aperture, the light from the first lens through a first surface of the first mirror, reflecting the light at a second surface of the first mirror, and refracting the light reflected from the second surface of the first mirror that is exiting the first mirror at the first surface of mirror; receiving, at a second mirror, the light from the first mirror, wherein the light is refracted through a second surface of the second mirror towards a first surface of the second mirror where the light is reflected back towards the second surface of the second mirror and refracted by the second surface upon exiting the second mirror; refracting, at a negative corrector lens, the light from the second mirror through the central aperture of the first mirror; and receiving, at a positive corrector lens, the light through the central aperture of the first mirror and refracting the light to an imaging surface, wherein: the first lens, the first mirror, the second mirror, the negative corrector lens, and the positive corrector lens are positioned along an axis in a satellite, a first distance between the first lens and the first mirror is less than one third a length of the satellite, and a back focal length of the optical device has a diameter that is no more than half of a largest diameter from the first lens and the first mirror.

The following detailed description and accompanying drawings provide a better understanding of the nature and advantages of particular embodiments.

DETAILED DESCRIPTION

Described herein are techniques for an optical system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a five element axially-aligned and axially-compressed optical system, such as a catadioptric cassegrain-type telescope. It will be understood in the art that the catadioptric attribute of the telescope relates the use of a lens and mirror combination and that the cassegrain attribute relates the use a primary concave mirror and secondary convex mirror. In one embodiment, the optical system may conform to the physical requirements of a nanosatellite, such as a 3U remote sensing satellite. A 1U unit is 10×10×10, and a 3U unit includes 3× the 1U size in one dimension, such as the dimensions of 10×10×30 cm.

To permit sufficient internal volume within the 3U nanosatellite for all components and systems necessary to operate the satellite, such as the satellite's imaging system, power system, radios, attitude control and determination system, and computer system, the optical system is compact such that the ratio between the optical system's aperture and the distance between the full aperture elements in the optical system may be the smallest attainable while being diffraction limited across the optical system's field of view. In one embodiment, the distance between the full aperture elements may be no longer than one-third of the total track length of the optical device when using spherical optical elements and with an overall track length of no more than the elongated length of the housing of the 3U nanosatellite. The back focal length portion, where the back focal length is a distance between the rear-most full aperture element and the image sensor, may have a diameter of no more than half of the full aperture diameter. This narrow back focal length diameter frees substantial volume in the housing of the 3U satellite form factor for the remainder of the satellite's systems, permitting a viable 3U nanosatellite to be operated. Concurrently, the diameter of the back focal length is large enough to fully illuminate a minimum of a 35 mm image sensor, maintaining focus across the image sensor. In this sense, the optical system (e.g., telescope) is diffraction limited across its field of view, such as across the 400 to 900 nanometer (nm) wavelengths.

While being compact, the optical system does not sacrifice optical performance. The optical system delivers light to the imaging sensor in sufficient intensity and free of significant aberration such that the satellite can effectively maintain a duty cycle including continuous imaging operations in the presence of sufficient state of charge, onboard storage, and downlink capacity to process and transfer the resulting volume of data.

To further simplify and reduce volume of the optical system, a nanosatellite may omit a traditional variable focus mechanism to maintain the alignment and focus of the optical system. Without an adjustable focus mechanism, it becomes necessary for the optical system to maintain focus across the thermal gradient present in a space environment. In one embodiment, each element of the optical system is composed of the same material to help maintain focus. When mated to the optical system's housing material, where the housing material is selected for similarity in coefficient of thermal expansion relative to the optical element material, the optical system expands and contracts uniformly with the housing material in response to thermal gradients. In other embodiments, the optical elements of the optical system may be composed of different materials so long as the coefficient of thermal expansion across the optical system and its mechanical housing are compatible. The optical system is therefore temperature stabilized.

Figure 1:
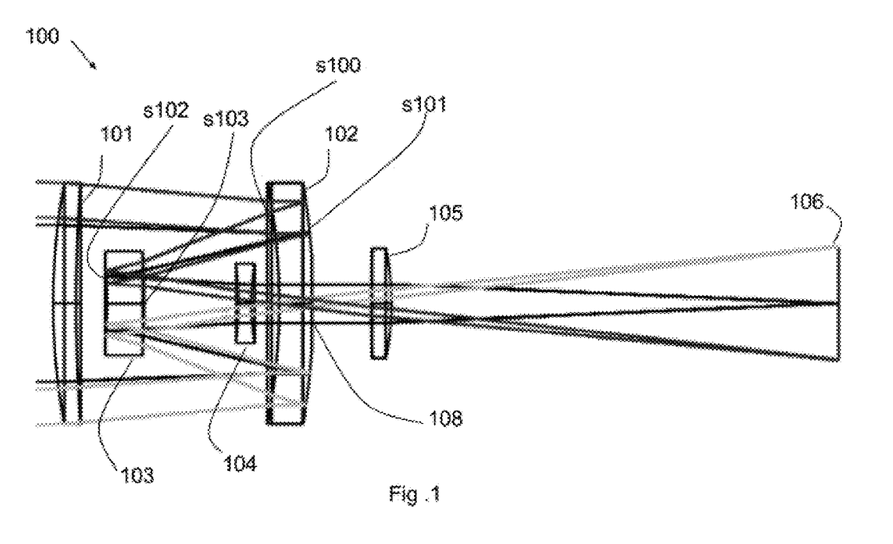
FIG. 1 shows an optical system with five elements according to one embodiment.

FIG. 1 shows an optical system 100 with five elements according to one embodiment. System 100 includes a full aperture lens 101, a primary mirror 102, a secondary mirror 103, a corrector lens 104, and a corrector lens 105. The five elements converge light onto an image sensor 106. Not shown are standard light baffles well known in the art to suppress stray light in the optical system.

In one embodiment, all of these five elements are spherical, and not aspherical. It will be understood in the art that the use of spherical optical elements may be easier to manufacture and lower cost. Use of aspherical optical elements is feasible, but the manufacture of such elements is more complicated, increasing the overall cost and complexity of the overall system.

Light enters optical system 100 through a full aperture lens 101. In one embodiment, full aperture lens 101 is a positive meniscus lens that includes a surface that is convex in a direction facing away from a primary mirror 102 and a concave side facing primary mirror 102. The convex lens focuses light from the object to be imaged onto primary mirror 102.

Primary mirror 102 is both a reflector and a lens, which may be referred to as a second surface mirror or a Mangin mirror. In one embodiment, primary mirror 102 is a concave meniscus lens with a central aperture 108. Light passes through primary mirror 102 twice. For example, light entering through full aperture lens 101 passes through a first surface s100 of primary mirror 102 until it reaches a second surface s101 of primary mirror 102. A second surface s101 of primary mirror 102 may be reflective, such as the second surface s101 is covered with a reflective substance, such as aluminum. From the second surface s101 of primary mirror 102, the light is reflected back toward second mirror 103, passing once again through the first surface s100 of primary mirror 102 prior to reaching second mirror 103. The effect of light passing through primary mirror 102 twice, once upon entering primary mirror 102 from full aperture lens 101 through first surface s100 and then again through first surface s100 after being reflected off the silvered second surface s101 of primary mirror 102 toward secondary mirror 103, is to shorten the overall track length of the optical system and to correct for optical aberrations.

Second mirror 103 may also be a combined reflector and lens. In one embodiment, second mirror 103 is a convex second surface Mangin-type sub-aperture mirror. That is, second mirror 103 is convex on a first surface s102 facing full aperture primary mirror 102. Second mirror 103 is separate from full aperture lens 101 and is set in between full aperture lens 101 and primary mirror 102.

Light striking second mirror 103 from primary mirror 102 passes through a second surface s103 of second mirror 103 to the first surface s102 of second mirror 103. The first surface s102 of second mirror 103 is reflective, and can be covered with a reflective substance, such as aluminum. The silvered convex surface s102 reflects the light, which is refracted toward corrector lens 104 via second surface s103. Corrector lens 104 is set in front of central aperture 108 of primary mirror 102 to receive light reflected off the first silvered surface s102 of second mirror 103. Light reflected off the first silvered surface s102 of second mirror 103 passes through second mirror 103 and exits through the second surface s103 of second mirror 103. Second mirror 103 thus operates twice on light passing through it, once upon being refracted on entering second mirror 103 from primary mirror 102, and then again when being reflected off first surface s102 and being refracted out of the second surface s103 of second mirror 103.

In one embodiment, corrector lens 104 is a sub-aperture negative meniscus lens disposed between second mirror 103 and primary mirror 102. The sub-aperture lens has a diameter that is less than the full aperture. As corrector lens 104 is a negative lens, light leaving the lens is dispersed outward toward central aperture 108 of primary mirror 102. Light passes through central aperture 108 to reach corrector lens 105. The passing of the light is in contrast to the reflection and refraction that was performed by primary mirror 102 when light was passed through lens 101 to the second surface s101 of primary mirror 102.

Sub-aperture corrector lens 105 is set behind the central aperture of primary mirror 102 and before imaging surface 106. Corrector lens 105 may be a positive plano convex lens. That is, corrector lens 105 has a convex surface that is set away from primary mirror 102. The surface of corrector lens 105 facing primary mirror 102 is flat, or plano. Although a plano surface is described, surfaces that are not flat may be used. Corrector lens 105 concentrates the light passing through it onto imaging surface 106 at the end of the telescope's focal length. Corrector lens 104 and corrector lens 105, when used as a corrector group, operate on the light passing through the optical system to correct lateral color and other aberrations.

In one embodiment, each optical element described in optical system 100 is spherical in shape and composed of the same material with a refractive index of around n=1.5168 and a coefficient of thermal expansion of around 7.1 ppm/° C. Differing material for the optical elements may be used so long as the refractive index and coefficient of thermal expansion are uniform or balanced. The focal length of this embodiment is 700 mm and its speed is f/7.6. Nanosatellites of 3U configuration equipped with the optical system are intended to operate at an observation distance of between 400 and 700 km above the surface of the Earth with a field of view from 2 to 3 degrees.

Figure 2:
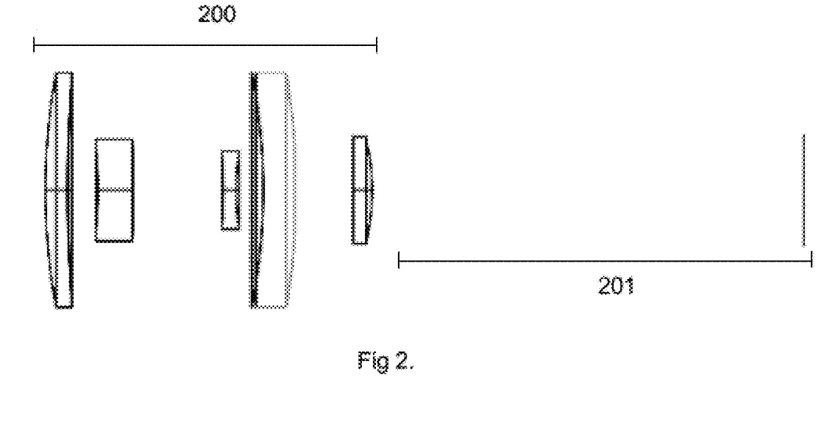
FIG. 2 and FIG. 3 show a relationship of the components of the optical system within a housing according to one embodiment.
Figure 3:
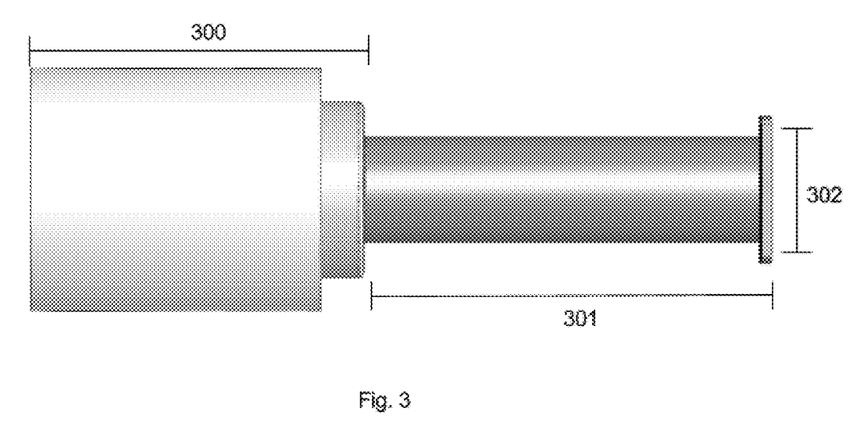

FIG. 2 and FIG. 3 show a relationship of the components of the optical system within a housing according to one embodiment. The housing of the optical system can be divided into two components: a forward portion 300 and a back focal length portion 301. The back focal length is the length between the last full aperture optical element to the imaging surface. In this case, the back focal length is from primary mirror 102 to imaging surface 106. The back focal length portion 301 spans the distance from the end of the forward portion 300 to the image sensor surface shown at 302. In some embodiments, forward portion 200 of optical system 100 includes the four optical elements of lens 101, primary mirror 102, secondary mirror 103, and corrector lens 104. Corrector lens 105 is found in a back portion 201. As shown in FIG. 2, in other embodiments, corrector lens 105 is closer to primary mirror 102 and may be in the forward portion 200. In this embodiment, forward portion 200 of optical system 100 is in forward portion 300 and back portion 201 of optical system 100 is in back focal length portion 301.

The back focal length portion 301 may be toward the rear of the 3U remote sensing nanosatellite. In one embodiment, the back focal length portion 301 is no greater than half the diameter of the full aperture elements (e.g., lens 101 and primary mirror 102) in the optical system. The reduced diameter of the back focal length 301 relative to the diameter of the full aperture forward portion 300 permits sufficient volume in the remainder of the 3U remote sensing nanosatellite for the other systems which comprise a functioning satellite, including power system, auxiliary optical systems, radio hardware, attitude control and determination, computational components, and related circuitry and mechanical implements. By axially compressing the position of four optical elements of lens 101, primary mirror 102, secondary mirror 103, and corrector lens 104, a longer back focal length portion 301 is achieved, which leaves additional room for the satellite components.

Figure 4:
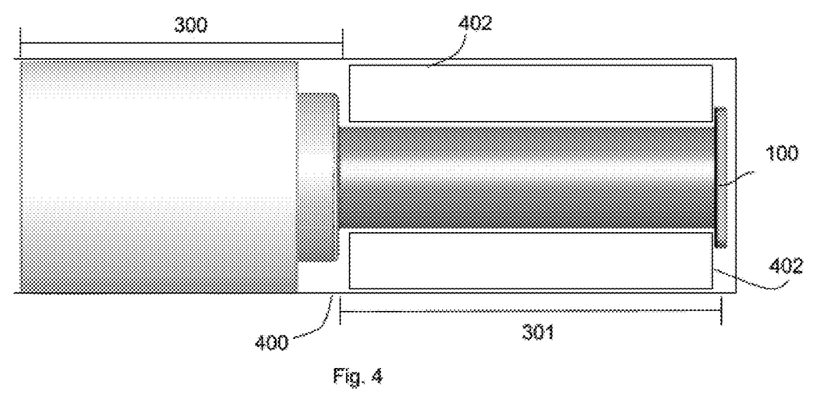
FIG. 4 shows an example of a satellite including the optical system according to one embodiment.

FIG. 4 shows an example of a satellite 400 including the optical system 100 according to one embodiment. As shown, components 402 of satellite 400 are integrated with optical system 100 in the 3U housing. The 3U housing is 10 cm (Width)×10 cm (Depth)×30 cm (Length). The optical system 100 is set along the 30 cm length of the nanosatellite. The diameter of the full aperture elements of optical system 100 is as large as the 3U housing permits. The reduced diameter of back focal length 301 allows the components 402 of satellite to be included. The forward portion 300 may take up the whole volume of the 3U housing of satellite 400 with small areas of space available due to the fitting of the spherical housing of the optical system in the square housing of satellite 400. However, by including the full aperture elements as far forward as possible while keeping the entire track length to around 300 mm, more of the interior volume of the 3U satellite is freed for components 402, which can be positioned around the spherical diameter of back focal length portion 301. In this sense, given that the distance between the full aperture elements is reduced to no more than one third of the length of the 3U nanosatellite, the resultant optical system is axially-compressed. In one embodiment, at least one sub aperture corrector is placed further back in the back focal length portion 301. The back portion of focal length portion 301 may be substantially near or flush with the housing of satellite 400. In some embodiments, components 402 may be located between the back portion of focal length portion 301 and the housing if there is space.

The forward portion 300 is larger in diameter than the back focal length portion 301. By compressing the size of forward portion 300, additional volume is gained in the satellite. The compression of size of forward portion 300 is achieved by including primary mirror 102 as both a reflector and a lens and also second mirror 103 as a combined reflector and lens. Use of aspherical optical elements would permit greater axial compression in the sense that the full aperture optical elements may be placed closer to one another. However, the use of such elements may not be desired as the manufacture of aspherical elements is more difficult and expensive. In the spherical embodiment disclosed, the optical system is compressed as far as spherical elements permit, no greater than one-third the overall track length set in a 3U nanosatellite, while remaining diffraction limited across a field of view of the optical system.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. An optical system comprising:
   a first lens configured to receive incoming light from an object;
   a first mirror comprising a central aperture, the first mirror configured to refract the light from the first lens through a first surface of the first mirror, reflect the light at a second surface of the first mirror, and refract the light reflected from the second surface of the first mirror that is exiting the first mirror at the first surface of the first mirror;

a second mirror configured to receive the light from the first mirror, wherein the light is refracted through a second surface of the second mirror towards a first surface of the second mirror where the light is reflected back towards the second surface of the second mirror and refracted by the second surface upon exiting the second mirror;

a negative corrector lens configured to refract the light from the second mirror through the central aperture of the first mirror; and a positive corrector lens configured to receive the light through the central aperture of the first mirror and refract the light to an imaging surface, wherein:

the first lens, the first mirror, the second mirror, the negative corrector lens, and the positive corrector lens are positioned along an axis in a satellite, a first distance between the first lens and the first mirror is less than one third a length of the optical system, a diameter of the positive corrector lens in a back focal length of the optical system is no more than half of a largest diameter from the first lens and the first mirror, and the optical system is enclosed in a single rectangular housing of the satellite.

2. The optical system of claim 1, wherein the first lens includes a convex side that faces away from the first mirror.

3. The optical system of claim 1, wherein the first mirror is a concave mirror.

4. The optical system of claim 1, wherein the second mirror is a convex mirror.

5. The optical system of claim 1, wherein the negative corrector lens is a sub-aperture negative meniscus lens.

6. The optical system of claim 1, wherein the positive corrector lens includes a first surface to receive the light and a second surface that is convex to concentrate the light onto the imaging surface.

7. The optical system of claim 1, wherein an image captured via the imaging surface is diffraction limited across a field of view of the optical system.

8. The optical system of claim 1, wherein the first lens, the first mirror, the second mirror, the negative corrector lens, and the positive corrector lens of the optical system have a compatible coefficient of thermal expansion.

9. The optical system of claim 1, herein:
the first lens is full aperture,
the first mirror is full aperture,
the second mirror is sub-aperture,
the negative corrector lens is sub-aperture, and
the positive corrector lens is sub-aperture.

10. The optical system of claim 1, wherein:
the first lens comprises a full aperture convex meniscus lens,
the first mirror comprises a concave meniscus mangin primary mirror,
the second mirror comprises a convex mangin sub-aperture secondary mirror,
the negative corrector lens comprises a negative meniscus sub-aperture corrector lens, and
the positive corrector lens comprises a positive convex sub-aperture corrector lens.

11. The optical system of claim 1, wherein the first lens, the first mirror, the second mirror, the negative corrector lens, and the positive corrector lens are spherical in shape.

12. The optical system of claim 1, wherein satellite operational components configured to operate the satellite and downlink images captured by the optical system are positioned around a portion including the positive corrector lens and not the first lens, first mirror, the second mirror, and the negative corrector lens.

13. The optical system of claim 1, wherein the optical system is no longer than a length of the housing.

14. The optical system of claim 1, wherein the optical system does not include a variable focus mechanism.

15. A satellite comprising:
a single rectangular satellite housing that encloses:
satellite operational components configured to operate the satellite and downlink images captured by an optical system; and
the optical system, wherein the optical system comprises:
a forward portion comprising:
a first lens configured to receive incoming light from an object;
a first mirror comprising a central aperture, the first mirror configured to refract the light from the first lens through a first surface of the first mirror, reflect the light at a second surface of the first mirror, and refract the light reflected from the second surface of the first mirror that is exiting the first mirror at the first surface of mirror;
a second mirror configured to receive the light from the first mirror, wherein the light is refracted through a second surface of the second mirror towards a first surface of the second mirror where the light is reflected back towards the second surface of the second mirror and refracted by the second surface upon exiting the second mirror;
a negative corrector lens configured to refract the light from the second mirror through the central aperture of the first mirror; and
a back portion comprising:
a positive corrector lens configured to receive the light through the central aperture of the first mirror and refract the light to an imaging surface to capture images,
wherein the optical system is within a length of the single rectangular satellite housing and the satellite operational components are located around the back portion.

16. The satellite of claim 15, wherein the optical system and the single rectangular satellite housing of the satellite have a compatible coefficient of thermal expansion.

17. The satellite of claim 15, wherein:
the first lens, the first mirror, the second mirror, the negative corrector lens, and the positive corrector lens are positioned along an axis in the satellite,
the forward portion is less than one third a length of the single rectangular satellite housing, and
a first diameter of the back portion is no more than half a second diameter of the forward portion.

18. The satellite of claim 15, wherein the satellite operational components are positioned around the back portion and not around the forward portion.

19. The satellite of claim 15, wherein:
the back portion has a diameter that is no more than half of a largest diameter from the first lens and the first mirror.

20. The satellite of claim 15, wherein:
the first lens is full aperture,
the first mirror is full aperture,
the second mirror is sub-aperture,
the negative corrector lens is sub-aperture, and
the positive corrector lens is sub-aperture.

21. The satellite of claim 15, wherein:
the first lens comprises a full aperture convex meniscus lens,
the first mirror comprises a concave meniscus mangin primary mirror,
the second mirror comprises a convex mangin sub-aperture secondary mirror,
the negative corrector lens comprises a negative meniscus sub-aperture corrector lens, and
the positive corrector lens comprises a positive convex sub-aperture corrector lens.

22. The satellite of claim 15, wherein the optical system is no longer than a length of the single rectangular satellite housing.

23. The satellite of claim 15, wherein a diameter of the forward portion approximates a height and a width of the single rectangular satellite housing.

24. A method comprising:
receiving, at a first lens, incoming light from an object;
refracting, at a first mirror comprising a central aperture, the light from the first lens through a first surface of the first mirror, reflecting the light at a second surface of the first mirror, and refracting the light reflected from the second surface of the first mirror that is exiting the first mirror at the first surface of mirror;
receiving, at a second mirror, the light from the first mirror, wherein the light is refracted through a second surface of the second mirror towards a first surface of the second mirror where the light is reflected back towards the second surface of the second mirror and refracted by the second surface upon exiting the second mirror;
refracting, at a negative corrector lens, the light from the second mirror through the central aperture of the first mirror; and
receiving, at a positive corrector lens, the light through the central aperture of the first mirror and refracting the light to an imaging surface,
wherein:
the first lens, the first mirror, the second mirror, the negative corrector lens, and the positive corrector lens form an optical system and are positioned along an axis in a satellite,
a first distance between the first lens and the first mirror is less than one third a length of the optical system,
a diameter of the positive corrector lens in a back focal length of the optical system is no more than half of a largest diameter from the first lens and the first mirror, and
the optical system is enclosed in a single rectangular housing of the satellite.

25. The method of claim 24, further comprising capturing an image via the imaging surface, wherein the image is diffraction limited across a field of view of the optical system.

* * * * *